Patented May 12, 1936

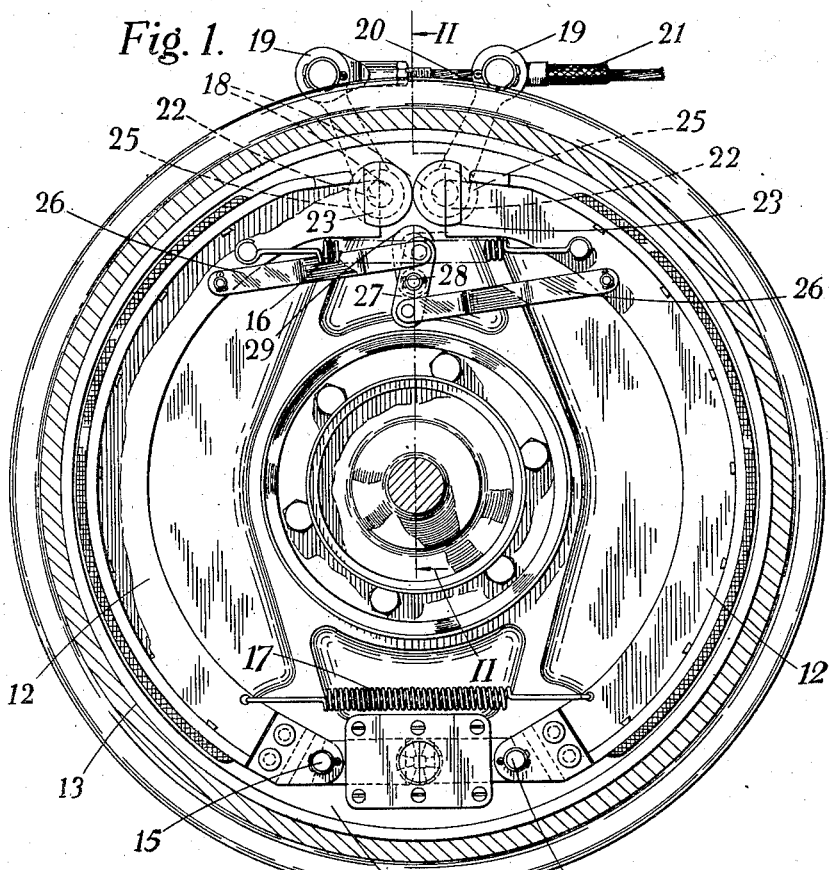
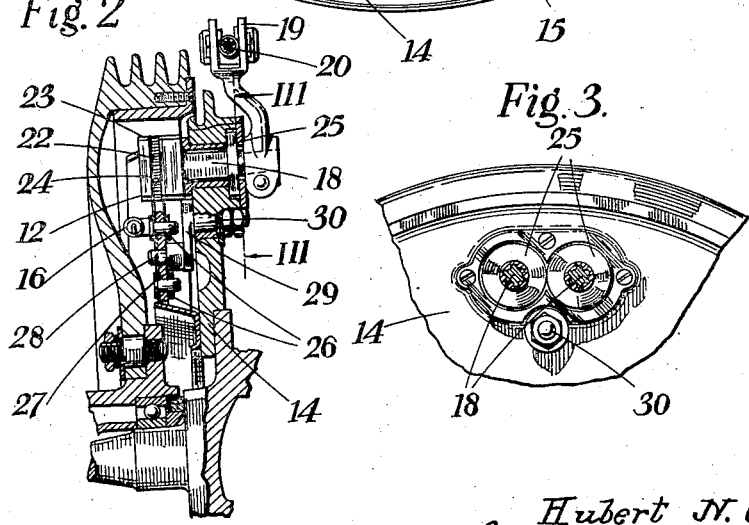
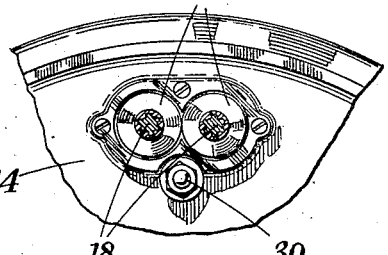

2,040,200

UNITED STATES PATENT OFFICE 2,040,200

VEHICLE BRAKE

Hubert Noel Charles and Henry Edward Cecil Cousins, Abingdon-on-Thames, England, assignors to The M. G. Car Company Limited, Abingdon-on-Thames, England Application July 11, 1935, Serial No. 30,900
In Great Britain March 24, 1934

2 Claims. (Cl. 188—78)

This invention relates to vehicle brakes, particularly to the kind having pivotally-mounted shoes and floating actuating means for thrusting them into contact with opposite sides of the internal periphery of a brake drum.

The main object of the invention is to provide an improved actuating means which will ensure substantially equal operation of the shoes and will be very frictionless. A further object is to prevent rocking of the shoes about their pivots when they are not in use, thereby avoiding objectionable rubbing and consequent wear of the friction material.

According to one feature of the invention, the brake shoes are connected by links, preferably near their free ends, to the opposite ends of a rocking lever the fulcrum of which is automatically movable in predetermined conditions, as, for example, against a material friction when a sufficient force is exerted upon the fulcrum.

According to a further feature of the invention, each of the shoes is acted upon through its own individual cam, both cams being simultaneously operable by the co-operating elements of a Bowden-type control.

According to a further feature of the invention, individual cams, for each of a pair of brake shoes, respectively, are supported from rollers which are spring pressed into rolling contact with one another and are simultaneously rotatable in opposite directions to effect actuation of the brake shoes. The cams can consist of flats formed at the bottom of grooves in the rollers.

In the accompanying drawing:—

Figure 1 is an elevation, with the drum broken away, of one form of brake according to the invention;

Figure 2 is a cross-section taken on the line II—II of Figure 1; and

Figure 3 is a fragmentary view taken on the line III—III of Figure 2.

In the construction illustrated, as applied to the brake of a motor-car, there is a pair of brake shoes 12, 12 operating against the interior surface of a brake drum 13, the shoes being pivotally mounted at adjacent ends on an anchor plate 14 by means providing for the adjustment of the pivots 15 away from one another to take up wear occurring in the brake. (Such means, being well known, are not specifically described here.) The other ends of the shoes are associated with individual floating cams which are rotatable in opposite directions to thrust the shoes outwardly. Tension springs 16, 17 are arranged across these latter to hold the brake off in a well understood manner.

The cam spindles 18, 18 carry arms 19 which are oppositely inclined to the plane that incorporates the main axes of the cam spindles. The arms are connected so as to be movable towards or away from one another in unison (whereby to rotate the cams in opposite directions) by means of a Bowden mechanism, the cable 20 of this being connected to one of the arms and the casing 21 to the other. The control of the Bowden mechanism (not shown) is such that the brake-applying force is distributed substantially equally between the casing and cable both of which are free to move.

A preferred arrangement of cam consists of a flat 22 formed in a D-shaped roller 23, the flat engaging the end of the associated brake shoe or of a part connected thereto. Preferably the flat is at the bottom of a groove 24 formed in the roller. The two rollers, which are arranged beside one another, are urged by the adjacent brake pull-off spring 16 into contact and when the brake is applied they roll upon one another with a minimum of friction. Conveniently the spindles 18 on which the rollers are fast extend with clearance through the anchor plate and carry outside, or in a recess in, the anchor plate a second pair of contacting rollers, 25, 25, the arms 19 being beyond these. The spindles may be located against endwise movement in any convenient manner. This cam mechanism being the invention of applicant Cousins herein is not claimed in the present case but is claimed in the copending sole application Serial No. 49,302 filed November 11, 1935.

For ensuring a correct initial setting of the brake shoes—i. e., that they remain properly centered relatively to the drum when the brake is off—they are conveniently connected near their free ends by links 26, 26 to the opposite ends of a one-to-one rocking lever 27 freely fulcrumed between its ends on a pin 28 carried by a crank arm 29. The latter is journalled in the anchor plate at 30 and it is secured therein relatively tightly but so that it can twist slightly about its pivotal axis when sufficient force is applied. If the brake be applied and one shoe should engage the brake drum materially before the other, not only does the rocking lever 27 turn freely about its fulcrum pin 28 during this but the latter fast on the crank arm 29 moves as necessary to centralize the shoes. Thereafter the fulcrum pin 28 remains in this new position until, owing to wear occurring or for any other reason, it is again automatically reset as described. The relative immobility of the fulcrum 28 prevents the system from rocking as a whole about the brake shoe pivots 15 when the brake is off.

Thus, by means of the invention, a substantially equal operation of the shoes can be ensured and the actuating means is very frictionless. In addition, the oscillation of the movable system, when the brake is off, can be prevented.

What we claim as our invention and desire to secure by Letters Patent of the United States is:—

1. A vehicle brake comprising a brake drum, an anchor plate, means carried by the anchor plate engaging an end of each shoe for supporting said end within the drum, cam means engaging the other ends of the shoes for moving the shoes into contact with the drum, and means engaging the shoes adjacent the other ends thereof for automatically centering the shoes relative to the drum, said centering means including a lever having oppositely extending studs disposed one at each end thereof, a bar pivotally mounted on one of said studs, links connected to the opposite ends of said bar and to the shoes adjacent said other ends, and means for securing the other stud to said anchor plate in a manner whereby said lever will be normally held against movement when the shoes are disposed an equal distance away from the drum, said securing means frictionally yielding under pressure of a link connected to a shoe contacting with the drum before contact of the other shoe with the drum whereby to maintain said first stud equidistant between said shoes.

2. A vehicle brake comprising a brake drum, brake shoes within the drum, an anchor plate, means carried by the anchor plate engaging an end of each shoe for supporting said end within the drum, cam means engaging the other ends of the shoes for moving the shoes into contact with the drum, and means engaging the shoes adjacent the other ends thereof for automatically centering the shoes relative to the drum, said centering means including a bell crank lever, a rock lever pivotally secured intermediate its ends to one end of the bell crank lever, means for securing the bell crank lever to the anchor plate, said securing means frictionally yielding under unequal pressure exerted on said rock lever whereby said rock lever will have the axis thereof bodily shifted, and links connected to the opposite ends of said rock lever and to the shoes adjacent said other ends, a link connected to a shoe contacting with the drum before contact of the other shoe with the drum exerting an unequal pressure upon the fulcrum of said rock lever whereby said fulcrum is bodily shifted, the securing means for securing the bell crank lever to the anchor plate maintaining the fulcrum of said rock lever in the position to which said fulcrum was shifted by one of said links.

HUBERT NOEL CHARLES.
HENRY EDWARD CECIL COUSINS.